US 11,318,487 B2

United States Patent
Ros et al.

(10) Patent No.: US 11,318,487 B2
(45) Date of Patent: May 3, 2022

(54) CO-FLOW INJECTION FOR SERIAL CRYSTALLOGRAPHY

(71) Applicants: Alexandra Ros, Phoenix, AZ (US); Daihyun Kim, Mesa, AZ (US); Austin Echelmeier, Tempe, AZ (US); Jorvani Cruz Villarreal, Tempe, AZ (US); Diandra Doppler, Scottsdale, AZ (US); Richard Kirian, Tempe, AZ (US); Reza Nazari, Tempe, AZ (US)

(72) Inventors: Alexandra Ros, Phoenix, AZ (US); Daihyun Kim, Mesa, AZ (US); Austin Echelmeier, Tempe, AZ (US); Jorvani Cruz Villarreal, Tempe, AZ (US); Diandra Doppler, Scottsdale, AZ (US); Richard Kirian, Tempe, AZ (US); Reza Nazari, Tempe, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 0 days.

(21) Appl. No.: 15/930,239

(22) Filed: May 12, 2020

(65) Prior Publication Data

US 2020/0360944 A1  Nov. 19, 2020

Related U.S. Application Data

(60) Provisional application No. 62/847,718, filed on May 14, 2019.

(51) Int. Cl.
*B05B 7/04* (2006.01)
*G01N 23/20008* (2018.01)

(52) U.S. Cl.
CPC ..... *B05B 7/0483* (2013.01); *G01N 23/20008* (2013.01)

(58) Field of Classification Search
CPC .. H05G 2/006; G01N 23/12; G01N 23/20008; G01N 23/20025;
(Continued)

(56) References Cited

U.S. PATENT DOCUMENTS

| 5,105,843 A * | 4/1992 | Condron | B29B 7/826 137/13 |
| 6,174,469 B1 * | 1/2001 | Ganan-Calvo | B05B 7/0475 264/12 |

(Continued)

FOREIGN PATENT DOCUMENTS

| WO | WO2009091416 A2 | 7/2009 |
| WO | WO2011150368 A1 | 12/2011 |

(Continued)

OTHER PUBLICATIONS

Acero et al., "A new flow focusing technique to produce very thin jets," J. Micromech. Microeng., vol. 23, No. 6, p. 065009, 2013.
(Continued)

*Primary Examiner* — Anastasia Midkiff
(74) *Attorney, Agent, or Firm* — Michael Best & Friedrich LLP

(57) ABSTRACT

Systems and methods for performing serial crystallography by providing an aqueous suspension of a crystal sample to a T-junction at a first flow rate and providing an immiscible oil fluid to the T-junction at a second flow rate. The aqueous suspension and the oil are combined at the T-junction to produce a co-flow output fluid including a parallel co-flow of the aqueous suspension and the oil in the same output channel. The co-flow output fluid is ejected as a jet stream through a nozzle and the sample flow rate in the crystal sample in the jet stream is adjusted by adjusting the first flow rate of the aqueous suspension and the second flow rate of the oil. By combining the aqueous sample and the oil in this manner, the output of the jet stream can be regulated for
(Continued)

compatibility with X-ray free electron laser serial crystallography.

13 Claims, 8 Drawing Sheets

(58) Field of Classification Search
CPC ............. G01N 23/2204; G01N 23/223; G01N 23/307; G01N 2291/022; G01N 2291/0222; G01N 2291/0228; G01N 2291/02416; B05B 7/02; B05B 7/04; B05B 7/0408; B05B 7/0416; B05B 7/0441; B05B 7/045; B05B 7/0483; B05B 7/06; B05B 7/062; B05B 7/066; B05B 7/067; B05B 7/068; B05B 7/12; B05B 7/08; B05B 7/0876; B05B 7/0884; B05B 7/1481; B05B 7/149; B05B 7/24; B05B 7/2402; B05B 7/2424; B05B 7/2443; B05B 7/2464; B05B 7/2472; B05B 7/26; B05B 7/262; B05B 7/28; B05B 7/32
See application file for complete search history.

(56) References Cited

U.S. PATENT DOCUMENTS

| | | | |
|---|---|---|---|
| 6,221,654 B1 | 4/2001 | Quake et al. | |
| 6,822,180 B2 | 11/2004 | Fujii et al. | |
| 6,976,590 B2 | 12/2005 | Deshpande et al. | |
| 7,341,211 B2 | 3/2008 | Ganan Calvo et al. | |
| 7,584,857 B2 | 9/2009 | Böhm et al. | |
| 7,708,949 B2 * | 5/2010 | Stone | B01F 5/0682 422/502 |
| 8,272,576 B2 | 9/2012 | Doak et al. | |
| 8,658,367 B2 | 2/2014 | Quake et al. | |
| 8,827,548 B2 | 9/2014 | Roukes et al. | |
| 8,844,570 B2 | 9/2014 | Glick | |
| 9,038,919 B2 | 5/2015 | Link et al. | |
| 9,192,944 B2 | 11/2015 | Ros et al. | |
| 9,227,200 B2 | 1/2016 | Chiou et al. | |
| 9,289,787 B2 | 3/2016 | Doak et al. | |
| 9,387,488 B2 | 7/2016 | Chou et al. | |
| 9,446,360 B2 | 9/2016 | Mazutis | |
| 9,643,136 B2 | 5/2017 | Hansen et al. | |
| 9,839,922 B2 | 12/2017 | Doak et al. | |
| 10,166,542 B2 | 1/2019 | Ros et al. | |
| 10,413,920 B2 | 9/2019 | Doak et al. | |
| 10,557,807 B2 | 2/2020 | Ros et al. | |
| 2007/0003442 A1 | 1/2007 | Link et al. | |
| 2007/0012891 A1 | 1/2007 | Maltezos et al. | |
| 2007/0080062 A1 | 4/2007 | Harnett et al. | |
| 2007/0228049 A1 | 10/2007 | Nordmeyer et al. | |
| 2008/0105565 A1 | 5/2008 | Davalos et al. | |
| 2009/0235990 A1 | 9/2009 | Beer | |
| 2010/0163116 A1 | 7/2010 | Fang et al. | |
| 2010/0196892 A1 | 8/2010 | Quake et al. | |
| 2010/0224255 A1 | 9/2010 | Mathies et al. | |
| 2010/0224493 A1 | 9/2010 | Davalos et al. | |
| 2010/0303687 A1 | 12/2010 | Blaga et al. | |
| 2012/0021523 A1 | 1/2012 | Fowler et al. | |
| 2012/0085649 A1 | 4/2012 | Sano et al. | |
| 2012/0266986 A1 | 10/2012 | Wimberger-Friedl et al. | |
| 2013/0032235 A1 | 2/2013 | Johnstone et al. | |
| 2013/0295653 A1 | 11/2013 | Quake et al. | |
| 2013/0308756 A1 | 11/2013 | Bogan et al. | |
| 2013/0313336 A1 | 11/2013 | Doak et al. | |
| 2014/0038279 A1 | 2/2014 | Ingber et al. | |
| 2014/0091012 A1 | 4/2014 | Ros et al. | |
| 2014/0263693 A1 | 9/2014 | Doak et al. | |
| 2014/0295572 A1 | 10/2014 | Fraden et al. | |
| 2015/0087559 A1 | 3/2015 | Putnam et al. | |
| 2016/0030658 A1 | 2/2016 | van der Merwe et al. | |
| 2016/0051995 A1 | 2/2016 | Weierstall et al. | |
| 2016/0129443 A1 | 5/2016 | Tovar et al. | |
| 2016/0151784 A1 | 6/2016 | Chiou et al. | |
| 2016/0341675 A1 | 11/2016 | Doak et al. | |
| 2016/0370306 A1 | 12/2016 | Conrad et al. | |
| 2017/0297024 A1 | 3/2017 | Ros et al. | |
| 2017/0274380 A1 | 9/2017 | Weierstall et al. | |
| 2018/0154380 A1 | 6/2018 | Doak et al. | |
| 2019/0134631 A1 | 5/2019 | Ros et al. | |
| 2019/0178822 A1 | 6/2019 | Ros et al. | |
| 2019/0184395 A1 | 6/2019 | Ros et al. | |
| 2019/0224689 A1 | 7/2019 | Ros et al. | |
| 2020/0141886 A1 | 5/2020 | Ros et al. | |
| 2020/0363348 A1 | 11/2020 | Ros et al. | |
| 2021/0001359 A1 | 1/2021 | Kirian et al. | |

FOREIGN PATENT DOCUMENTS

| | | |
|---|---|---|
| WO | WO2013075081 A2 | 5/2013 |
| WO | WO2014151231 A1 | 9/2014 |
| WO | WO2016044545 A1 | 3/2016 |
| WO | WO2016164562 A1 | 10/2016 |
| WO | WO2017003725 A1 | 1/2017 |
| WO | WO2018013685 A1 | 1/2018 |
| WO | WO2018217793 A1 | 11/2018 |
| WO | WO2018217831 A1 | 11/2018 |

OTHER PUBLICATIONS

Akthakul A. et al., "Size fractionation of metal nanoparticles by membrane filtration", Advanced Materials, vol. 17, Issue 5, pp. 532-535 (2005).

Almen M.S. et al., "Mapping the human membrane proteome: a majority of the human membrane proteins can be classified according to function and evolutionary origin", BMC Biology, vol. 7, Issue 1, pp. 50 (2009).

Beech et al., "Tipping the balance of deterministic lateral displacement devices using dielectrophoresis," Lab Chip, 2009, 9:2698-2706.

Bhattacharya S. et al., "Insulator-based dielectrophoretic single particle and single cancer cell trapping", Electrophoresis, vol. 32, Issue 18, pp. 2550-2558 (2011).

Bligh M. et al., "Sorting microparticles into lateral streams using a two-phase rectangular electrokinetic array", Journal of Micromechanics and Microengineering, vol. 18, Issue 4, pp. 045002 (2008).

Boekema E.J. et al., "Evidence for a trimeric organization of the photosystem I complex from the thermophilic cyanobacterium *Synechococcus* sp.", FEBS Letters, vol. 217, Issue 2, pp. 283-286 (1987).

Bogunovic et al., Particle sorting by a structured microfluidic ratchet device with tunable selectivity: theory and experiment. Soft Matter 2012, 8 (14), 3900-3907.

Boutet S. et al., "High-Resolution Protein Structure Determination by Serial Femtosecond Crystallography", Science, vol. 337, Issue 6092, pp. 362-364 (2012).

Braschler et al., "Continuous separation of cells by balanced dielectrophoretic forces at multiple frequencies," Lab on a Chip, 2008, 8, 280-286.

Calzolai L. et al., "Separation and characterization of gold nanoparticle mixtures by flow-field-flow fractionation", Journal of Chromatography A, vol. 1218, Issue 27, pp. 4234-4239 (2011).

Cesaro-Tadic et al., High-sensitivity miniaturized immunoassays for tumor necrosis factor a using microfluidic systems. Lab on a Chip 2004, 4 (6), 563-569.

Chapman H. N. et al., "Femtosecond X-ray protein nanocrystallography", Nature-London, vol. 470, Issue 7332, pp. 73-77 (2011).

Chapman H.N., "X-ray imaging beyond the limits", Nature Materials, vol. 8, Issue 4, pp. 299-301 (2009).

Chen G. et al., "High-Purity Separation of Gold Nanoparticle Dimers and Trimers", Journal of the American Chemical Society, vol. 131, Issue 12, pp. 4218-4219 (2009).

Cheng I.F. et al., "A continuous high-throughput bioparticle sorter based on 3D traveling-wave dielectrophoresis", Lab on a chip, vol. 9, Issue 22. pp. 3193-3201 (2009).

(56) References Cited

OTHER PUBLICATIONS

Chinen et al., Nanoparticle Probes for the Detection of Cancer Biomarkers, Cells, and Tissues by Fluorescence. Chemical Reviews 2015, 115 (19), 10530-10574.
Chung et al., Ultrastructural changes of mitochondria in the skeletal muscle of patients with amyotrophic lateral sclerosis. Ultrastruct Pathol 2002, 26 (1), 3-7.
Cordelières, "Manual Tracking," ImageJ plugin, 2005, <https://imagej-nihgov.ezproxy1.lib.asu.edu/ij/plugins/track/track.html> 3 pages.
Cummings E.B. et al., "Dielectrophoresis in Microchips Containing Arrays of Insulating Posts: Theoretical and Experimental Results", Analytical Chemistry, vol. 75, Issue 18, pp. 4724-4731 (2003).
Davalos et al., "Performance impact of dynamic surface coatings on polymeric insulator-based dielectrophoretic particle separators," Anal. Bioanal. Chem. 2008, 390, 847-855.
DePonte, D. P., et al. "Gas Dynamic Virtual Nozzle for Generation of Microscopic Droplet Streams," J. Phys. D. Appl. Phys. 2008, 41, 195505, 7.
Dertinger S.K.W. et al., "Generation of Gradients Having Complex Shapes Using Microfluidic Networks", Anal. Chem., 73, 1240-1246 (2001).
Devaraju, N. et al., "Pressure driven digital logic in PDMS based microfluidic devices fabricated by multilayer soft lithography", Lab on a Chip, Nov. 2012, vol. 12, No. 22, pp. 4809-4815 <DOI:10.1039/c2lc21155f>.
Doak R.B. et al., "Microscopic linear liquid streams in vacuum: Injection of solvated biological samples into X-ray free electron lasers", AIP Conference Proceedings, vol. 1501, pp. 1314-1323 (2012).
Drews et al., Ratcheted electrophoresis for rapid particle transport. Lab on a Chip 2013, 13(22), 4295-4298.
Duffy et al., "Determination of Properties of Individual Liposomes by Capillary Electrophoresis with Postcolumn Laser-Induced Fluorescence Detection," Anal. Chem. 2001, 73, 1855-1861.
Eguchi et al., Giant mitochondria in acute lymphocytic leukemia. Exp Mol Pathol 1987, 47(1), 69-75.
Fernández-Vizarra et al., Isolation of biogenetically competent mitochondria from mammalian tissues and cultured cells. Methods 2002, 26 (4), 292-297.
Fiedler S. et al., "Dielectrophoretic Sorting of Particles and Cells in a Microsystem", Analytical Chemistry, vol. 70, Issue 9, pp. 1909-1915 (1998).
Fromme P et al., "Improved isolation and crystallization of Photosystem I for structural analysis", Biochimica et Biophysica Acta, vol. 1365, Issue 1-2, pp. 175-184 (1998).
Fromme P. et al., "Femtosecond nanoorystallography using X-ray lasers for membrane protein structure determination", Current Opinion in Structural Biology, vol. 21, Issue 4, pp. 509-516 (2011).
Gan et al., "Six Helix Bundle and Triangle DNA Origami Insulator-Based Dielectrophoresis," Anal. Chem. 2013, 85, 11427-11434.
Gañán-Calvo et al., "Liquid Capillary Micro/Nanojets in Free-Jet Expansion," Small, vol. 6, No. 7, pp. 822-824, Apr. 2010.
Gascoyne P.R. et al., "Particle separation by dielectrophoresis", Electrophoresis, vol. 23, Issue 13, pp. 1973-1983 (2002).
Gerion D. et al., "Sorting Fluorescent Nanocrystals with DNA", Journal of the American Chemical Society, vol. 124, Issue 24, pp. 7070-7074 (2002).
Giddings, "Unified Separation Science," Wiley ; New York 1991.
Gonzalez et al., Gonzalez, C. F.; Remcho, V. T., Fabrication and evaluation of a ratchet type dielectrophoretic device for particle analysis. Journal of Chromatography A 2009, 1216 (52), 9063-9070.
Gorre-Talini et al., Dielectrophoretic ratchets. Chaos 1998, 8(3), 650-656.
Green N.G. et al., "Dielectrophoresis of Submicrometer Latex Spheres. 1. Experimental Results", Journal of Physical Chemistry B, vol. 103, Issue 1, pp. 41-50 (1999).
Haenggi et al., Artificial Brownian motors: Controlling transport on the nanoscale. Reviews of Modern Physics 2009, 81 (1), 387-442.
Heffner et al., The early effects of ischemia upon skeletal muscle mitochondria. J Neurol Sci 1978, 38 (3), 295-315.

Hellmich W. et al., "Poly(oxyethylene) Based Surface Coatings for Poly(dimethylsiloxane) Microchannels", Langmuir, vol. 21, Issue 16, pp. 7551-7557 (2005).
Holmes D. et al., "On-chip high-speed sorting of micron-sized particles for high-throughput analysis", IEE proceedings. Nanobiotechnology, vol. 152, Issue 4, pp. 129-135 (2005).
Holzel et al., "Trapping Single Molecules by Dielectrophoresis," Phys. Rev. Lett. 2005, 95, 128102.
Hornig-Do et al., "Isolation of functional pure mitochondria by superparamagnetic microbeads," Anal. Biochem. 2009, 389, 1-5.
Huang et al., "Current-monitoring method for measuring the electroosmotic flow rate in capillary zone electrophoresis," Anal. Chem. 1988, 60, 1837-1838.
Hunter M.S. et al., "Toward structure determination using membrane-protein nanocrystals and microcrystals", Methods, vol. 55, Issue 4, pp. 387-404 (2011).
Hunter M.S. et al., "X-ray Diffraction from Membrane Protein Nanocrystals", Biophysical Journal, vol. 100, Issue 1, pp. 198-206 (2011).
International Preliminary Report on Patentability for Application No. PCT/US2017/041708 dated Jan. 24, 2019, 8 pages.
International Preliminary Report on Patentability for Application No. PCT/US2018/033989 dated Dec. 5, 2019, 7 pages.
International Search Report and Written Opinion for Application No. PCT/US2015/050616 dated Jan. 18, 2016, 11 pages.
International Search Report and Written Opinion for Application No. PCT/US2017/041708 dated Oct. 23, 2017, 9 pages.
International Search Report and Written Opinion for Application No. PCT/US2018/033944 dated Sep. 26, 2018, 14 pages.
International Search Report and Written Opinion for Application No. PCT/US2018/033989 dated Jul. 20, 2018, 13 pages.
Jeon N.L. et al., "Generation of Solution and Surface Gradients Using Microfluidic Systems", Langmuir, 16, 8311-8316 (2000).
Jones et al., "Continuous Separation of DNA Molecules by Size Using Insulator-Based Dielectrophoresis," Anal. Chem. 2017, 89, 1531-1539.
Jordan P. et al., "Three-dimensional structure of cyanobacterial photosystem I at 2.5 A resolution", Nature, vol. 411, Jun. 21, pp. 909-917 (2001).
Jores K. et al., "Investigations on the structure of solid lipid nanoparticles (SLN) and oil-loaded solid lipid nanoparticles by photon correlation spectroscopy, field-flow fractionation and transmission electron microscopy", Journal of Controlled Release, vol. 95, Issue 2, pp. 217-227 (2004).
Kale et al., Continuous-flow dielectrophoretic trapping and patterning of colloidal particles in a ratchet microchannel. Journal of Micromechanics and Microengineering 2014, 24 (7) 6 pages.
Kang et al., Separation of mitochondria by flow field-flow fractionation for proteomic analysis. Analyst 2008, 133 (4), 505-515.
Kim et al., "Deterministic Ratchet for Sub-micrometer (Bio)particle Separation," Anal. Chem., 2018, 90 (7), pp. 4370-4379.
Kim et al., "Dynamic Constriction Insulator-Based Dielectrophoresis for Particle Manipulation," 2016, 1 page.
Kissick D.J. et al., "Second-Order Nonlinear Optical Imaging of Chiral Crystals", Annual Review of Analytical Chemistry, vol. 4, pp. 419-437 (2011).
Kralj J.G. et al., "Continuous Dielectrophoretic Size-Based Particle Sorting", Analytical Chemistry, vol. 78, Issue 14, pp. 5019-5025 (2006).
Kung, Y-C. et al., "Tunable dielectrophoresis for sheathless 3D focusing", IEEE International Conference on Micro Electro Mechanical Systems (Estoril, Portugal, Jan. 18-22, 2015), 2015 (Date added to IEEE Xplore: Mar. 2015), pp. 196-199 <DOI:10.1109/MEMSYS.2015.7050920>.
Lapizco-Encinas B.H. et al., "Insulator-based dielectrophoresis for the selective concentration and separation of live bacteria in water", Electrophoresis, vol. 25, Issue 10-11, pp. 1695-1704 (2004).
Latham A.H. et al., "Capillary Magnetic Field Flow Fractionation and Analysis of Magnetic Nanoparticles", Analytical Chemistry, vol. 77, Issue 15, pp. 5055-5062 (2005).
Li N. et al., "Parallel mixing of photolithographically defined nanoliter volumes using elastomeric microvalve arrays", Electrophoresis, 26, 3758—3764 (2005).

(56) References Cited

OTHER PUBLICATIONS

Liao et al., "Nanoscale Molecular Traps and Dams for Ultrafast Protein Enrichment in High-Conductivity Buffers," J. Am. Chem. Soc. 2012, 134, 8742-8745.
Lin et al., Highly selective biomechanical separation of cancer cells from leukocytes using microfluidic ratchets and hydrodynamic concentrator. Biomicrofluidics 2013, 7 (3); 034114.
Loutherback et al., Deterministic Microfluidic Ratchet. Physical Review Letters 2009, 102, 045301.
Lundstrom K., "Structural genomics and drug discovery", Journal of Cellular and Molecular Medicine, vol. 11, Issue 2, pp. 224-238 (2007).
Luo et al., Insulator-based dielectrophoresis of mitochondria. Biomicrofluidics 2014, 8 (2), 021801.
Luo, J. H.; Muratore, K. A.; Arriaga, E. A.; Ros, A., Deterministic Absolute Negative Mobility for Micro- and Submicrometer Particles Induced in a Microfluidic Device. Analytical Chemistry 2016, 88 (11), 5920-5927.
Mafune, F, et al., "Microcrystal Delivery by Pulsed Liquid Droplet for Serial Femtosecond Crystallography", Acta Crystallographica Section D, Apr. 2016 [available online Mar. 2016], vol. 72, Part 4, pp. 520-523 <DOI:10.1107/S2059798316001480>.
Majewski P. et al., "Synthesis, Surface Modifications, and Size-Sorting of Mixed Nickel-Zinc Ferrite Colloidal Magnetic Nanoparticles", Chemistry: a European journal, vol. 14, Issue 26, pp. 7961-7968 (2008).
Mancuso, A. P., "The Single Particles, Clusters and Biomolecules and Serial Femtosecond Crystallography instrument of the European XFEL: initial installation", J. Synchrotron Radiation 2019, 26, 660-676.
Marquet et al., Rectified motion of colloids in asymmetrically structured channels. Physical Review Letters 2002, 88 (16) 168301.
Martinez-Duarte R. et al., "Microfabrication technologies in dielectrophoresis applications—A review", Electrophoresis, vol. 33, Issue 21, pp. 3110-3132 (2012).
Martinez-Lopez et al., "Characterization of electrokinetic mobility of microparticles in order to improve dielectrophoretic concentration," Anal. Bioanal. Chem. 2009, 394, 293-302.
Martin-Garcia, J. M., et al. "Serial Femtosecond Crystallography: A Revolution In Structural Biology," Arch. Biochem. Biophys. 2016, 602, 32-47.
Matias et al., Giant mitochondria and intramitochondrial inclusions in benign thyroid lesions. Ultrastruct Pathol 1991, 15 (3), 221-9.
McFaul et al., Cell separation based on size and deformability using microfluidic funnel ratchets. Lab on a Chip 2012, 12 (13), 2369-2376.
Michelsen et al., Isolation of Subcellular Organelles and Structures. Methods in Enzymology 2009, 463, 305-28.
Morgan et al., Separation of submicron bioparticles by dielectrophoresis. Biophysical Journal 1999, 77 (1), 516-525.
Muller T. et al., "A 3-D microelectrode system for handling and caging single cells and particles", Biosensors & Bioelectronics, vol. 14, Issue 3, pp. 247-256 (1999).
Nakano A. et al., "Tuning direct current streaming dielectrophoresis of proteins", Biomicrofluidics, vol. 6, Issue 3, pp. 34108 (2012).
Nakano et al., "Temporal and Spatial Temperature Measurement in Insulator-based Dielectrophoretic Devices," Analytical Chemistry (2014) 86, 6516-6524.
Nakano et al., Immunoglobulin G and bovine serum albumin streaming dielectrophoresis in a microfluidic device. Electrophoresis 2011, 32 (17), 2314-2322.
Navratil et al., Giant mitochondria do not fuse and exchange their contents with normal mitochondria. Exp Cell Res 2008, 314 (1), 164-72.
Nelson et al., "Three-dimensional-printed gas dynamic virtual nozzles for x-ray laser sample delivery". Optics Express, 2016, 24, 11515-11530.
Novak J P. et al., "Purification of Molecularly Bridged Metal Nanoparticle Arrays by Centrifugation and Size Exclusior Chromatography", Analytical Chemistry, vol. 73, Issue 23, pp. 5758-5761 (2001).
Ozuna-Chacon S. et al., "Performance characterization of an insulator-based dielectrophoretic microdevice", Electrophoresis, vol. 29, Issue 15, pp. 3115-3122 (2008).
Pamme N. et al., "Continuous sorting of magnetic cells via on-chip free-flow magnetophoresis", Lab on A Chip, vol. 6, Issue 8, pp. 974-980 (2006).
Pamme N. et al., "On-Chip Free-Flow Magnetophoresis: Continuous Flow Separation of Magnetic Particles and Agglomerates", Analytical Chemistry, vol. 76, Issue 24, pp. 7250-7256 (2004).
Papadimitriou et al., Giant mitochondria with paracrystalline inclusions in paraganglioma of the urinary bladder: correlation with mitochondrial abnormalities in paragangliomas of other sites. Ultrastruct Pathol 1994, 18 (6), 559-64.
Pethig, Review Article-Dielectrophoresis: Status of the theory, technology, and applications. Biomicrofluidics 2010, 4 (2) 022811-1-022811-35.
Pohl H.A. et al., "Di Electrophoresis of Cells", Biophysical Journal, vol. 11, pp. 711-727 (1971).
Pohl H.A. et al., "Dielectrophoretic Force", J Theor. Biol., vol. 37, pp. 1-13 (1972).
Pohl, Dielectrophoresis : The Behavior of Neutral Matter in Nonuniform Electric Fields. Cambridge ; New York : Cambridge University Press 1978.
Pommer M.S. et al., "Dielectrophoretic separation of platelets from diluted whole blood in microfluidic channels", Electrophoresis, vol. 29, Issue 6, pp. 1213-1218 (2008).
Redecke L. et al., "Natively Inhibited Trypanosoma brucei Cathepsin B Structure Determined by Using an X-ray Laser", Science, vol. 339, Issue 6116, pp. 227-230 (2013).
Regtmeier et al., "Dielectrophoretic manipulation of DNA: Separation and polarizability," A. Anal. Chem. 2007, 79, 3925-3932.
Regtmeier et al., Acceleration of absolute negative mobility. Journal of Separation Science 2007, 30 (10), 1461-1467.
Roessler, C. et al., "Acoustic Injectors for Drop-On-Demand Serial Femtosecond Crystallography", Structure, Apr. 2016 [available online Mar. 2016], vol. 24, No. 4, pp. 631-6410, S1-S19.
Ros et al., "Co-flow injection facilitates improved injection for MHz Crystallography," published Mar. 2, 2020, (2 pages).
Safarik et al., Magnetic techniques for the isolation and purification of proteins and peptides. Biomagn Res Technol 2004, 2, 7, 18 pages.
Salomon S. et al., "A dielectrophoretic continuous flow sorter using integrated microelectrodes coupled to a channel constriction", Electrophoresis, vol. 32, Issue 12, pp. 1508-1514 (2011).
Schubert W.D. et al., "Photosystem I of Synechococcus elongatus at 4 A Resolution: Comprehensive Structure Analysis", Journal of Molecular Biology, vol. 272, Issue 5, pp. 741-769 (1997).
Shafiq et al., Giant mitochondria in human muscle with inclusions. Arch Neurol 1967, 17 (6), 666-71.
Spence J.C. et al., "X-ray lasers for structural and dynamic Biology", Rep Prog Phys, vol. 75, Issue 10, pp. 102601 (2012).
Srivastava S.K. et al., "A continuous DC-insulator dielectrophoretic sorter of microparticles", Journal of chromatography. A, vol. 1218, Issue 13, pp. 1780-1789 (2011).
Srivastava S.K. et al., "DC insulator dielectrophoretic applications in microdevice technology: a review", Analytical and Bioanalytical Chemistry, vol. 399, Issue 1, pp. 301-321 (2011).
Srivastava S.K. et al., "Direct current insulator-based dielectrophoretic characterization of erythrocytes: ABO-Rh human blood typing", Electrophoresis, vol. 32, Issue 18, pp. 2530-2540 (2011).
Sturm et al., Ratchets in hydrodynamic flow: more than waterwheels. Interface Focus 2014, 4 (6) 9 pages.
Sugiura, Y. et al., "Fabrication of Microfluidic Valves Using a Hydrogel Molding Method", Scientific Reports, Aug. 2015, vol. 5, No. 13375, 7 pages <DOI:10.1038/srep13375>.
Tang, S. et al., "Basic Microfluidic and Soft Lithographic Techniques", in: Optofluidics: Fundamentals, Devices and Applications (Ed. Y. Fainmain), 2010, Ch. 2, pp. 7-31.

(56) References Cited

OTHER PUBLICATIONS

Thoenes et al., On matrix-rich giant mitochondria. Electron microscopic observations on tubular epithelium of the human kidney in the nephrotic syndrome. Z Zellforsch Mikrosk Anat 1966, 75 (2), 422-33.

Tice, J. et al., "A monolithic poly(dimethylsiloxane) electrostatic actuator for controlling integrated pneumatic microsystems", Sensors and Actuators A: Physical, Jul. 2013 (available online Mar. 2013), vol. 196, pp. 22-29 <DOI:10.1016/j.sna.2013.03.020>.

U.S. Appl. No. 15/930,313, filed May 12, 2020, Ros et al.

Unger et al., "Monolithic microfabricated valves and pumps by multilayer soft lithography," Science, 288, 113-16 (2000).

Vega et al., "Global and local instability of flow focusing: The influence of the geometry," Physics of Fluids, vol. 22, No. 6, p. 064105, Jun. 2010.

Vidal, C. et al., "Fabrication of Pneumatic Microvalves for PDMS Microfluidic Devices", International Congress of Mechanical Engineering (Gramado, Brazil, Nov. 15-20, 2009), 2009, 7 pages.

Viefhues M. et al., "Physisorbed surface coatings for poly(dimethylsiloxane) and quartz microfluidic devices", Analytical and Bioanalytical Chemistry, vol. 401, Issue 7, pp. 2113-2122 (2011).

Wampler R.E. et al., "Selective Detection of Protein Crystals by Second Harmonic Microscopy", Journal of the American Chemical Society, vol. 130, Issue 43, pp. 14076-14077 (2008).

Weierstall U. et al., "Injector for scattering measurements on fully solvated biospecies", Review of Scientific Instruments. vol. 83, Issue 3, pp. 035108 (2012).

Weierstall, U., et al. "Lipidic cubic phase injector facilitates membrane protein serial femtosecond crystallography," Nat. Commun. 2014, 5, 1, 3309.

Wiedorn, M., et al. "Megahertz Serial Crystallography," Nat. Commun. 2018, 9, 1, 4025.

Yamada et al. "Differential Permeabilization Effects of Ca2+ and Valinomycin on the Inner and Outer Mitochondrial Membranes as Revealed by Proteomics Analysis of Proteins Released from Mitochondria," Mol. Cell Proteomics, 2009, 8, 1265-1277.

Yang et al, "Toward Analysis of Proteins in Single Cells: A Quantitative Approach Employing Isobaric Tags with MALDI Mass Spectrometry Realized with a Microfluidic Platform," Anal. Chem. 2016, 88, 6672-6679.

Yang et al., High Speed Size Sorting of Subcellular Organelles by Flow Field-Flow Fractionation. Analytical Chemistry 2015, 87 (12), 6342-6348.

Yang J. et al., "Size sorting of Au and Pt nanoparticles from arbitrary particle size distributions", Analytics Chimica Acta, vol. 546, Issue 2, pp. 133-138 (2005).

Yates et al, "Proteomics of organelles and large cellular structures," Nat. Rev. Mol. Cell Biol. 2005, 6, 702-714.

Zhu J. et al., Dielectrophoretic focusing of particles in a microchannel constriction using DC-biased AC flectric fields, Electrophoresis, vol. 30, Issue 15 pp. 2668-2675 (2009).

* cited by examiner

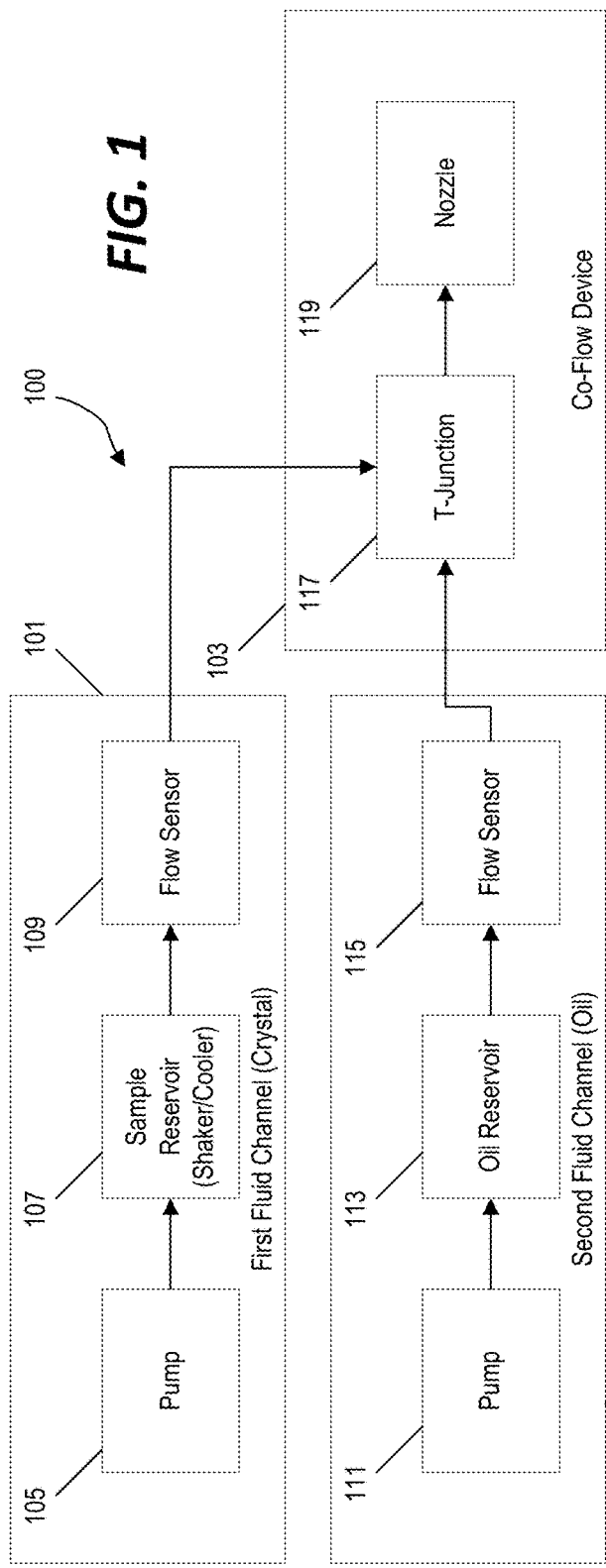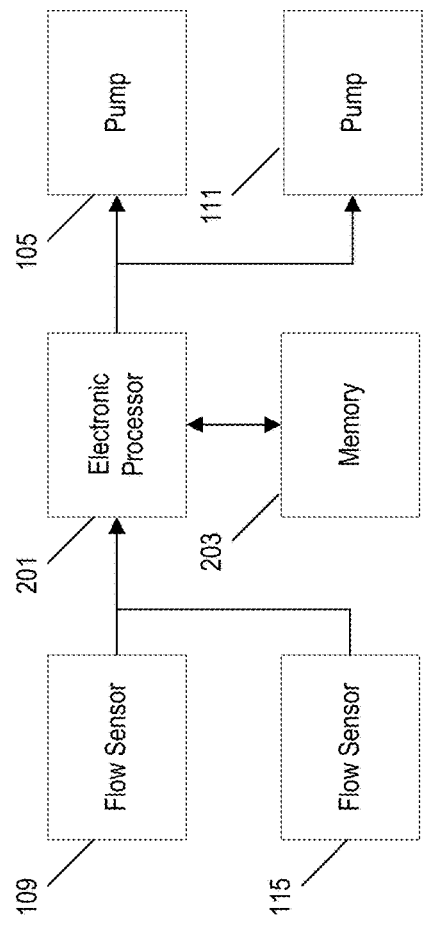

|  |  | Condition 1 | Condition 2 | Condition 3 |
|---|---|---|---|---|
| Oil Flow Rate (Pump) | µL/min | 18 | 15 | 10 |
| Oil Flow Rate (Sensor) | µL/min | 17.3 | 14.1 | 9.5 |
| Oil Pump Pressure | psi | 126 | 119 | 92 |
| Aq Flow Rate (Pump) | µL/min | 2 | 5 | 10 |
| Aq Flow Rate (Sensor) | µL/min | 1.8 | 5.1 | 9.2 |
| Aq Pump Pressure | psi | 150 | 113 | 105 |
| Total Flow Rate | µL/min | 20 | 20 | 20 |
| Flow Rate Ratio | Oil/Ag | 9 | 3 | 1 |
| He Gas Pressure | psi | 300 | 300 | 300 |
| Observed Distance of Stable Co-Flow | cm | 1.5 | 2.5 | 1.5 |

CO-FLOW INJECTION FOR SERIAL CRYSTALLOGRAPHY

RELATED APPLICATIONS

This Application claims the benefit of U.S. Provisional Patent Application No. 62/847,718, filed May 14, 2019 and entitled "CO-FLOW INJECTION FOR SERIAL CRYSTALLOGRAPHY," the entire contents of which are incorporated herein by reference.

STATEMENT REGARDING FEDERALLY SPONSORED RESEARCH OR DEVELOPMENT

This invention was made with government support under R01 GM095583 awarded by the National Institutes of Health and under 1231306 awarded by the National Science Foundation. The government has certain rights in the invention.

BACKGROUND

The present invention relates to systems and methods for crystallography and, more specifically, serial crystallography.

SUMMARY

The onset of serial femtosecond crystallography (SFX) with X-ray free electron lasers (XFELs) has enabled crystal structure determination of reaction intermediates at ambient temperatures. Unlike traditional crystallography, where a single crystal is irradiated as it rotates, SFX usually involves the injection of a continuous stream of randomly oriented protein crystals into the path of the XFEL beam. Each crystal hit by the x-ray yields a diffraction snapshot, and thousands of these snapshots are merged to form a dataset. While SFX has allowed the study of numerous protein structures previously inaccessible with standard crystallography at synchrotrons, the myriad crystal suspensions for many proteins of interest remains a challenge. At the European XFEL (EuXFEL), X-ray pulses are produced in 10 Hz bursts with a repetition rate in the MHz range within each burst, and this unique pulse structure necessitates high velocity jets to refresh crystal sample between pulses. Some sample delivery methods for protein crystals in viscous media slowly extrude sample and are, therefore, incompatible with MHz pulses.

In some embodiments, the systems and methods described herein produce stable injection of a rather viscous crystal suspension at velocities compatible with the EuXFEL pulse structure by co-flowing an immiscible liquid during injection. In some implementations, the system includes a 3D-printed co-flow device including a T-junction in close proximity to a gas dynamic virtual nozzle (GDVN) to inject the protein crystal sample for serial crystallography applications. In some implementations, the co-flow device is fabricated by a 2-photon polymerization 3D-printer as a monolithic piece. After developing a photoresist, fused silica capillaries for liquid and gas delivery are glued into the device. In some implementations, the device can be used at pressures required to drive sample through more than a meter of small inner diameter capillary to the co-flow device (e.g., 1000 psi).

In some implementations, an aqueous crystal suspension sample and an immiscible fluorinated oil flow parallel (i.e., co-flow) through the T-junction and are coaxially focused into a jet by helium gas in the nozzle. The sample flow thickness can be modified by controlling the flow rate ratios. With this approach, the crystal suspension can be injected at flow rates as low as 2 µL/min, while oil flow rate compensates the necessary flow rate for injection. At the single particles, clusters, and biomolecules (SPB)/SFX instrument of the European X-ray fee electron lasers (EuXFEL), the co-flow device injected oil (20 µL/min, 13.3 cP) and PSII crystals in a viscous buffer (5 µL/min, 27.2 cP) to form a stable jet for SFX data collection. In comparison to injecting viscous crystal suspension alone, which resulted in dripping rather than jetting, the co-flowing liquids form a stable sample jet resulting in an improved hit rate with reduced sample volume consumption.

In one embodiment, the invention provides a sample ejection device for serial crystallography. The device includes a first fluid channel, a second fluid channel, an output channel, and a T-junction. The T-junction is configured to receive a first fluid from the first fluid channel in a first flow direction and to receive a second fluid from the second fluid channel in a second flow direction, the second flow direction being different from the first flow direction. The T-junction outputs a combined fluid output to the output channel that includes a parallel co-flow of the first fluid and the second fluid.

In another embodiment the invention provides a method of performing serial crystallography by providing an aqueous suspension of a crystal sample to a T-junction at a first flow rate and providing an immiscible fluorinated oil fluid to the T-junction at a second flow rate. The aqueous suspension and the oil are combined at the T-junction to produce a co-flow output fluid including a parallel co-flow of the aqueous suspension and the oil in the same output channel. The co-flow output fluid is ejected as a jet stream through a nozzle and the sample flow rate in the crystal sample in the jet stream is adjusted by adjusting the first flow rate of the aqueous suspension and the second flow rate of the immiscible fluorinated oil.

Other aspects of the invention will become apparent by consideration of the detailed description and accompanying drawings.

BRIEF DESCRIPTION OF THE DRAWINGS

FIG. 1 is a schematic block diagram of a sample ejection system for serial crystallography including a T-junction co-flow device according to some embodiments.

FIG. 2 is a block diagram of a control system for the sample ejection system of FIG. 1.

DETAILED DESCRIPTION

Figure 3A:
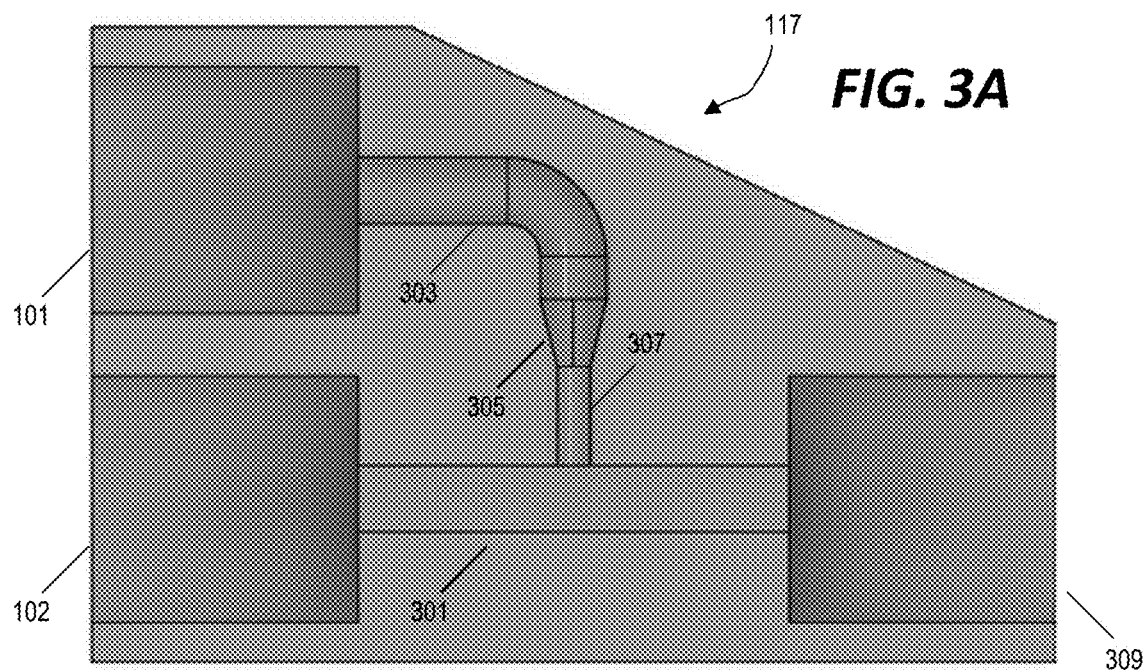
FIG. 3A is a cut-away overhead view of an example of a T-junction co-flow device for use in the system of FIG. 1.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

FIG. 1 illustrates an example of a sample ejection system 100 for serial crystallography. The system includes a first fluid channel 101, a second fluid channel 102 and a co-flow device 103. In some implementations, the first fluid channel 101 is designated as an aqueous line for controllable flow of an aqueous crystal suspension (i.e., the "sample") while the second fluid channel 102 is designated as an oil line for controllable flow of an immiscible fluorinated oil. The two fluid channels meet at the co-flow device 103 to produce a parallel "co-flow" of the aqueous crystal suspension and the immiscible fluorinated oil as described in further detail below.

The first fluid channel 101 includes a pump 105 (e.g., a HPLC ("High-performance Liquid Chromatography") pump) coupled to a sample reservoir 107. In some implementations, the sample reservoir 107 is configured to provide a shaker and/or cooler function for the sample in the sample reservoir 107. The controllable operation of the pump 105 forces the same from the sample reservoir 107 through a capillary/channel of the first fluid channel 101 at a controllable flow rate. The first fluid channel also includes a flow sensor 109 configured to monitor the flow rate of the fluid media (i.e., the aqueous crystal suspension) through the first fluid channel 101, for example, as a feedback control input for operation of the pump 105 (as described in further detail below).

Similarly, the second fluid channel includes a pump 111 coupled to an oil reservoir 113 and configured to controllable pump oil from the oil reservoir 113 through a capillary/channel of the second fluid channel 102 at a controllable flow rate. The second fluid channel 102 also includes a flow sensor 115 configured to monitor the flow rate of the fluid media (i.e., the oil) through the second fluid channel 102, for example, as a feedback control input for the operation of the pump 111 (as described in further detail below).

The co-flow device 103 includes a T-junction 117 configured to simultaneously receive fluid media separately from the output of the first fluid channel 101 and the output of the second fluid channel 102 and to produce an output fluid in a "co-flow" manner towards a nozzle 119 that is configured to expel the fluid as a pressurized jet. In some implementations, the nozzle 119 is gas dynamic virtual nozzle (GDVN). In some implementations, such as in the example of FIG. 1, the nozzle is integrated as a part of the co-flow device 103 while, in other implementations, the nozzle is a separate device that receives the co-flow output from the co-flow device 103.

FIG. 2 illustrates an example of a control system for the sample ejection system 100 of FIG. 1. The control system includes an electronic processor 201 communicatively coupled to a non-transitory computer-readable memory 203. The memory 203 stores data and instructions that, when executed by the electronic processor 201 provide control functionality for the sample ejection system 100. In some implementations, the electronic processor 201 and the memory 203 are provided as components of a computer or other controller configured to control the operation of the system. In the example of FIG. 2, the electronic processor 201 is communicative coupled to the flow sensor 109 of the first fluid channel 101, the flow sensor 115 of the second fluid channel 102, the pump 105 of the first fluid channel 101, and the pump 111 of the second fluid channel 102 to provide feedback-based control of the sample ejection system 100.

For example, a controller (e.g., including the electronic processor 201 and the memory 203) may be configured to provide a defined target flow rate for the aqueous crystal suspension and the oil by operating the pumps 105, 111 at initial respective pressure settings, monitoring actual flow rate achieved at the respective pressure settings based on the output received from the flow sensors 109, 115, and adjusting the respective pressure settings based on the actual flow rates. Furthermore, although the example of FIG. 2 illustrates only two pumps and two flow sensors, other implementations may include additional actuators and/or sensors communicative coupled to the controller. For example, in some implementations, the first fluid channel 101 and/or the second fluid channel 102 may be configured to include a flow sensor positioned between the pump and the fluid reservoir in addition to or instead of the flow sensor positioned between the sample reservoir and the T-junction of the co-flow device (as illustrated in the example of FIG. 1). Additionally, in some implementations, one or more controllers may be configured to provide additional functionality including, for example, controlling a gas output pressure for operation of the GDVN or to control the operation of a EuXFEL system for capturing image data of the ejected sample stream.

Figure 3B:
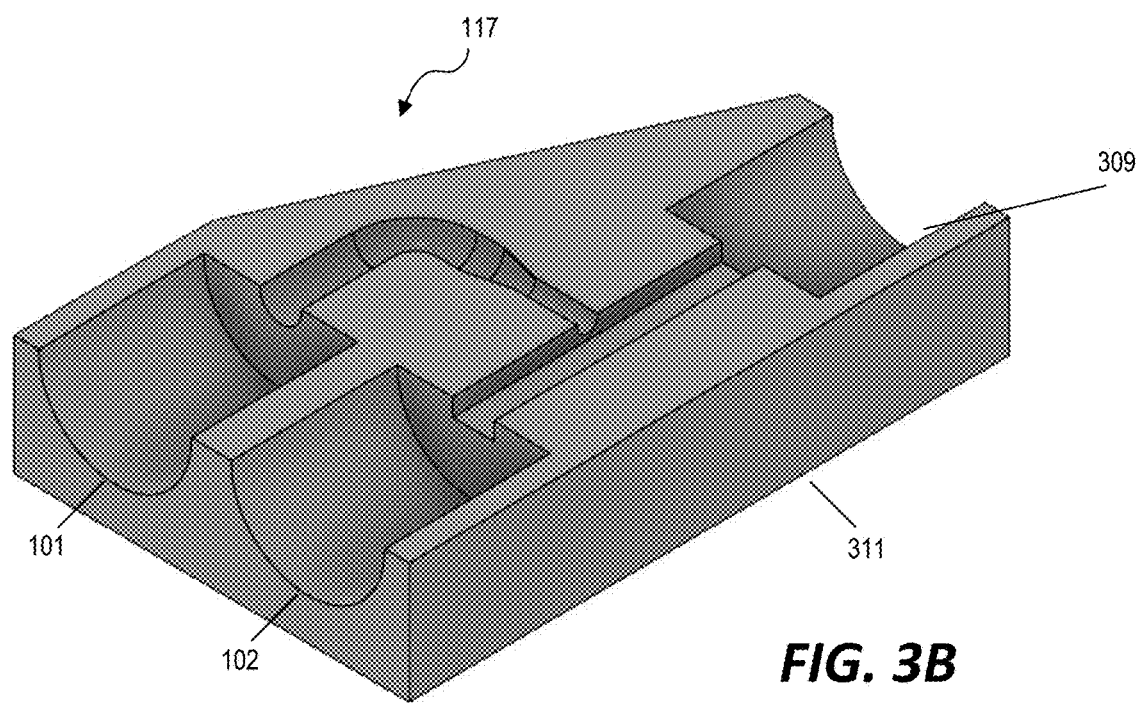
FIG. 3B is a cut-away perspective view of the T-junction co-flow device of FIG. 3A.

FIGS. 3A and 3B illustrate one example of a T-junction component 117 for use in the system 100 of FIG. 1. The T-junction component 117 includes a co-flow channel 301 that is coupled to the output of the fluid channel that conveys the oil (i.e., the second fluid channel 102). A sample output channel 303 is coupled to the output of the fluid channel that conveys the suspended sample (i.e., the first fluid channel 101) and extends to the co-flow channel 301. The sample output channel 303 is coupled to the co-flow channel at a 90-degree angle. As described in further detail below, the T-junction component 117 causes the sample and the oil to flow in parallel through the co-flow channel 301. The output of the co-flow channel 301 is coupled to an output channel 309 which delivers the co-flowing fluids toward a nozzle (e.g., nozzle 119 of FIG. 1).

In the example of FIGS. 3A and 3B, the sample output channel 303 includes a tapered section 305 that gradually reduces a diameter of the sample output channel 303 from a main section of the sample output channel 303 to a smaller diameter section 307. Additionally, in the example of FIGS. 3A and 3B, the fluid channels that convey the sample and the oil (i.e., fluid channels 101, 102) both enter the T-junction component 117. Accordingly, the sample output channel 303 includes a curved portion to redirect flow from a direction parallel to the co-flow channel 301 to a direction perpendicular to the co-flow channel 301. However, in other implementations, the T-junction component 117 may be configured instead to couple to the first fluid channel 101 and the second fluid channel 102 in perpendicular directions such that the flow direction of the sample does not need to be redirected within the sample output channel 303 in the T-junction component 117.

As illustrated in the perspective view of FIG. 3B, the T-junction component 117 is manufactured as a single component with the fluid channels formed within a T-junction component body 311. In some implementations, the T-junction component 117 may be fabricated monolithically by a 3D printing process to produce the T-junction component 117 as a single piece. In other implementations, the T-junction component 117 may be fabricated by another process—such as, for example, injection molding. The example of the T-junction component 117 is illustrated in FIGS. 3A and 3B as a "cut-away" showing only half of the channels in order to illustrate the lay-out and configuration of the various fluid channels. In some implementations, the T-junction component 117 will also include another mirrored half enclosing the channels and structure as illustrated in FIGS. 3A and 3B. The two mirrored halves of the T-junction component 117 can be fabricated as a single piece (e.g., when using 3D printing) or as two separate pieces that are later coupled together to form the T-junction component 117 (e.g., when using injection molding).

Figure 4A:
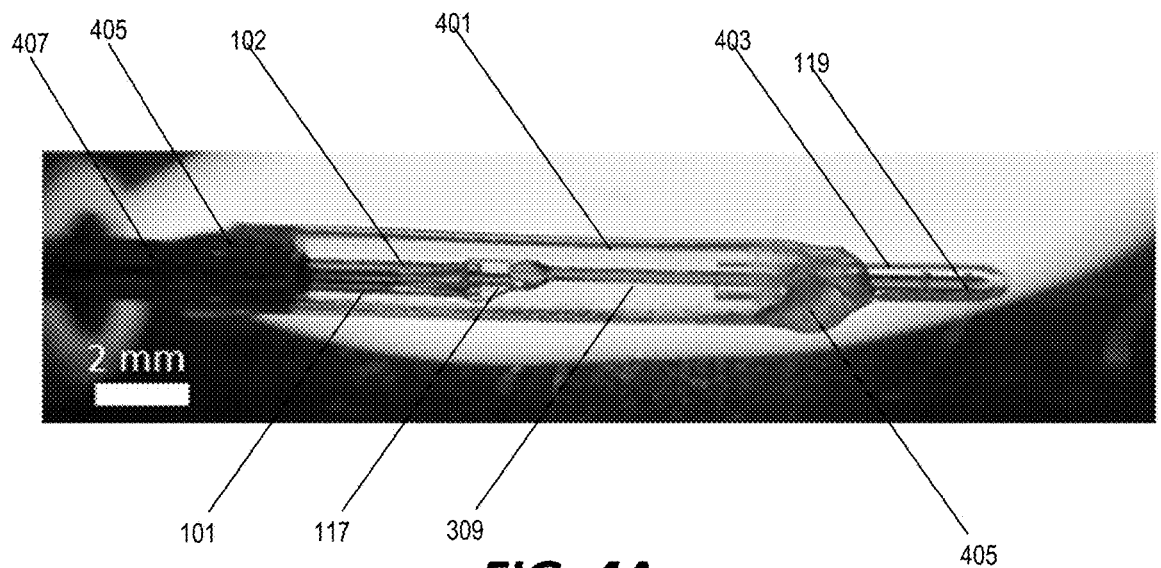
FIG. 4A is an elevation view of a sample ejection system of FIG. 1 including the T-junction co-flow device of FIG. 3A.

FIG. 4A shows an example of the T-junction component 117 of FIGS. 3A and 3B as a component of a sample ejection system. The first fluid channel 101 and the second fluid channel 102 are coupled to the T-junction component 117 as inputs. The T-junction component 117 is coupled to the nozzle 119 by the output channel 309. In the example of FIG. 4A, the first fluid channel 101 and the second fluid channel 102 include fused glass capillaries (OD: 365 µm, ID: 100 µm) coupled to the T-junction component 117 using an epoxy glue. The T-junction component 117, the glass capillaries of the first fluid channel 101 and the second fluid channel 102, and the output channel 309 (also provided in this example as a fused glass capillary) are housed within a main body housing 401. In some implementations, the main body housing 401 is provided as a tube (e.g., a glass tube). The nozzle 119 is also partially encased in a glass outer case 403. As shown in the example of FIG. 4A, the glass outer case 403 of the nozzle 119 has a diameter that is smaller than a diameter of the main body housing 401, partially extends into an internal volume of the main body housing 401 at a distal end of the main body housing 401, and is coupled and sealed to the main body housing 401 by the epoxy glue 405. At a proximal end of the main body housing, the glass capillaries of the first fluid channel 101 and the second fluid channel 102 extend through a metal sleeve 407 that is coupled to the main housing body 401 by the epoxy glue 405.

Figure 4B:
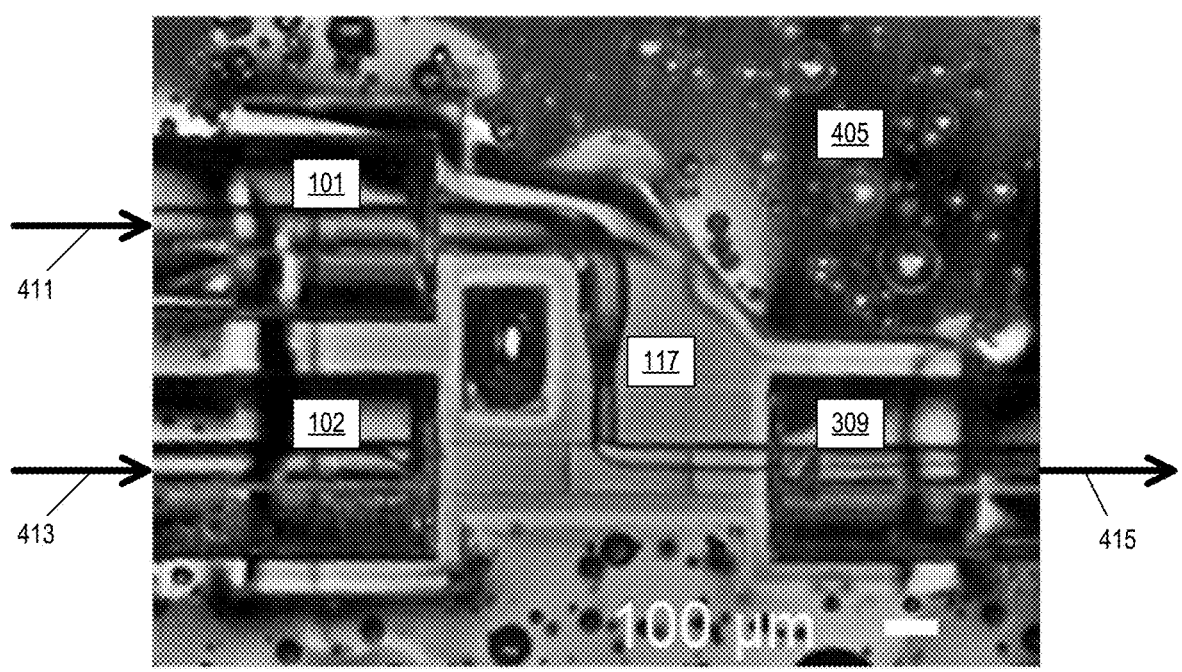
FIG. 4B is a close-up elevation view of the T-junction co-flow device in the system of FIG. 4A.

In some implementations, the various components are coupled to each other, for example, using an epoxy glue only at the point of coupling. In other implementations, as shown in the example of FIG. 4B, the main body housing 401 is filled with the epoxy glue 405. By filling the main body housing 401 with the epoxy glue 405, the glass capillaries of the first fluid channel 101, the second fluid channel, and the output channel 309 are coupled to the T-junction component 117.

As also illustrated in FIG. 4B, the configuration of FIG. 4A causes the T-junction component 117 to receive sample fluid flow 411 through the first fluid channel 101 and oil flow 413 through the second fluid channel 102 both in a direction towards the T-junction component 117. As visible in the example of FIG. 4B, the T-junction configuration produces a co-flow output 415 in which the sample and the oil both flow into the output channel 309 in a direction away from the T-junction component 117. Further details of the co-flow output 415 are described below.

Figure 5A:
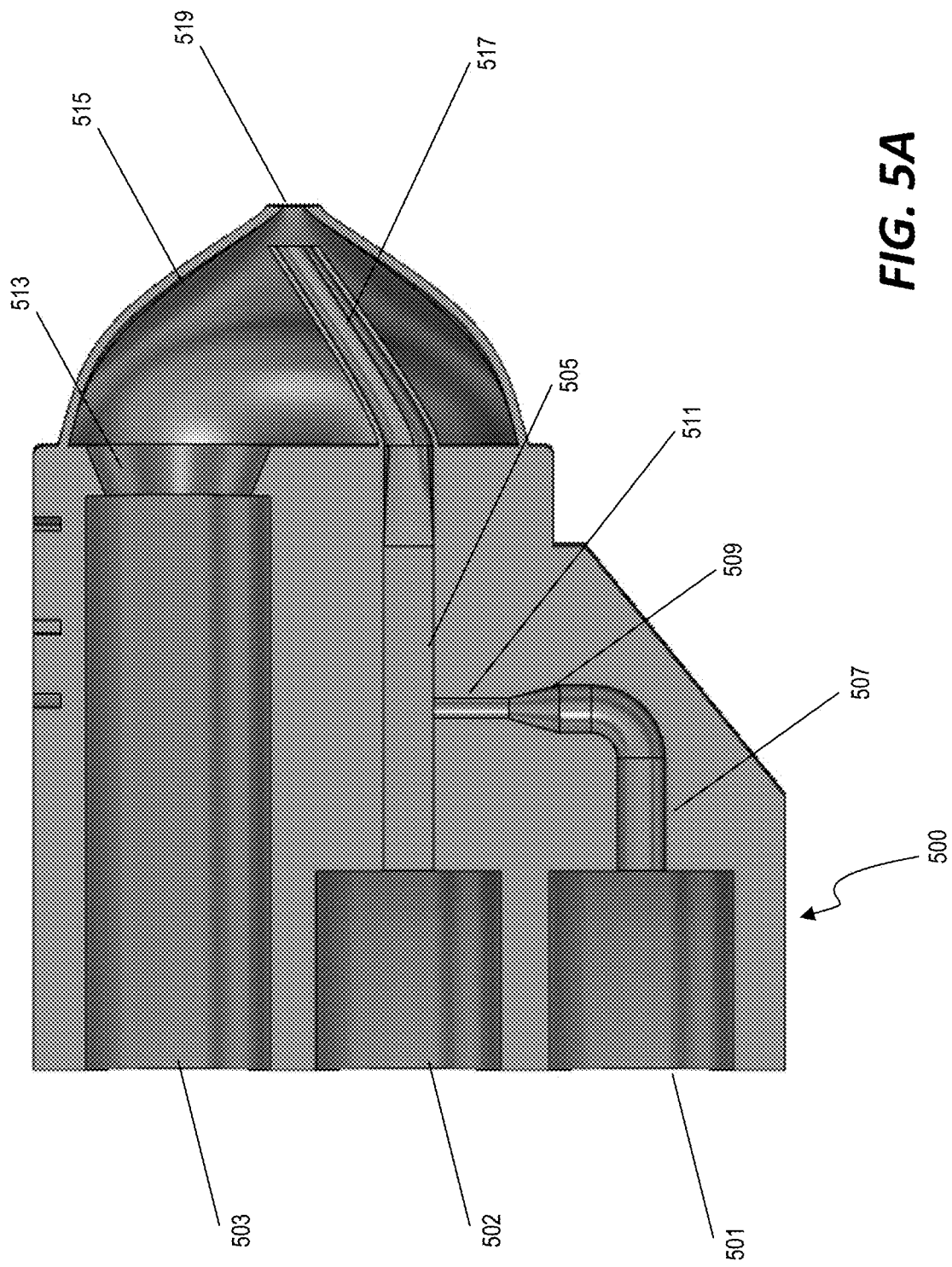
FIG. 5A is a cut-away overhead view of an example of a jet nozzle including a T-junction co-flow device for use in the system of FIG. 1.
Figure 5B:
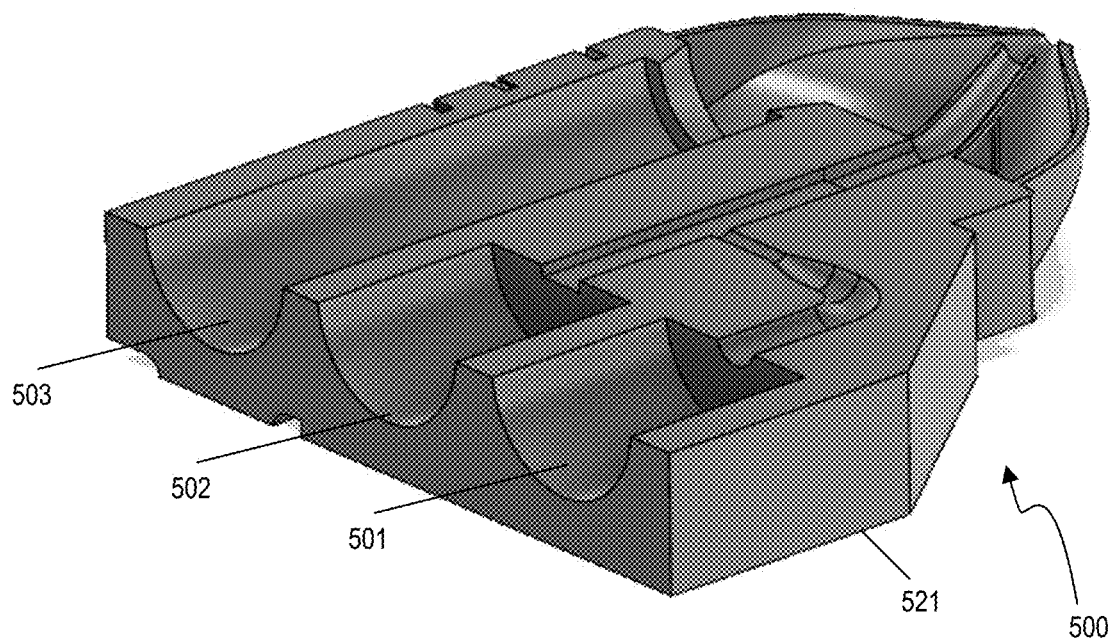
FIG. 5B is a cut-away perspective view of the jet nozzle of FIG. 5A.

In the example of FIGS. 3A, 3B, and 4A, the T-junction component 117 is formed separately from the nozzle and is coupled to the nozzle by an output channel 309. In contrast, FIGS. 5A and 5B illustrate an example of a co-flow device 103 that includes both the T-junction 117 and the nozzle 119 integrally formed as a single component 500. The co-flow device 500 includes three separate input channels—a first fluid input channel 501, a second fluid input channel 502, and a pressured gas channel 503. The first fluid input channel 501 is configured to couple to an output of the first fluid channel 101 of the system of FIG. 1 and, thereby, to receive the sample suspension as a pressurized fluid flow. Similarly, the second fluid input channel 502 is configured to couple to an output of the second fluid channel 102 of the system of FIG. 1 and, thereby, to receive the oil as a pressurized fluid flow.

The co-flow device 500 of FIG. 5A includes a T-junction arrangement that is similar to that of the T-junction component 117 illustrated in the example of FIGS. 3A and 3B. A co-flow channel 505 is coupled directly to the end of the second fluid input channel 502 and is coupled to the first fluid input channel 501 by a sample output channel 507. Like in the example of FIGS. 3A and 3B, the sample output channel 507 is curved to redirect fluid flow from a direction parallel to the co-flow channel 505 to a direction perpendicular to the co-flow channel 505. In the example of FIG. 5A, the sample output channel 507 also includes a tapered section 509 configured to reduce the diameter of the sample output channel 507 to a smaller diameter section 511 that is coupled to the co-flow channel 505. After entering the co-flow device 500 through the first fluid input channel 501 and passing through the sample output channel 507 (including passing through both the tapered section 509 and the smaller-diameter section 511), the sample suspension fluid enters the co-flow channel 505 from a direction perpendicular to the flow of oil in the co-flow channel 505.

The co-flow device 500 of FIG. 5A also includes a pressurized gas channel 503 that is configured to receive pressurized gas (e.g., pressurized Helium gas) that will eject the fluid (including both oil and sample) as a jet output stream. A distal end of the pressurized gas channel 503 includes a reverse-tapered portion 513 that couples the pressurized gas channel 503 to an internal nozzle volume 515. An output channel 517 is coupled to the co-flow channel 505 and configured to release the stream of pressurized fluid into the internal nozzle volume 515 near an output opening 519 of the nozzle. As illustrated in the example of FIG. 5A, the internal nozzle volume 515 and the output channel 517 are configured such that pressurized gas (provided to the internal nozzle volume 515 from the pressurized gas channel 503) approaches the output opening 519 of the nozzle around an entire perimeter of the distal end of the output channel 517. In this way, the fluid and the pressurized gas are emitted from the output opening 519 of the nozzle in a coaxial arrangement (with the fluid stream at the center and surrounded by pressurized gas).

FIG. 5B shows the same co-flow device 500 from FIG. 5A in a cut-away perspective view. Like in the example of FIGS. 3A and 3B, FIGS. 5A and 5B only illustrate one half 521 of the co-flow device 500 in cut-away in order to demonstrate the lay-out and configuration of the various channels within the device. In some implementations, the co-flow device 500 may include a single piece (formed, for example, by 3D printing) including both the portion illustrated in FIGS. 5A and 5B as well as a mirrored portion that completes & seals the various channels illustrated in FIGS. 5A and 5B. In other implementations, the co-flow device 500 may be fabricated as separate pieces (formed, for example, by injection molding) including, for example, the portion 521 illustrated in FIGS. 5A and 5B and a mirrored portion that are subsequently coupled to form the co-flow device 500.

Figure 5C:
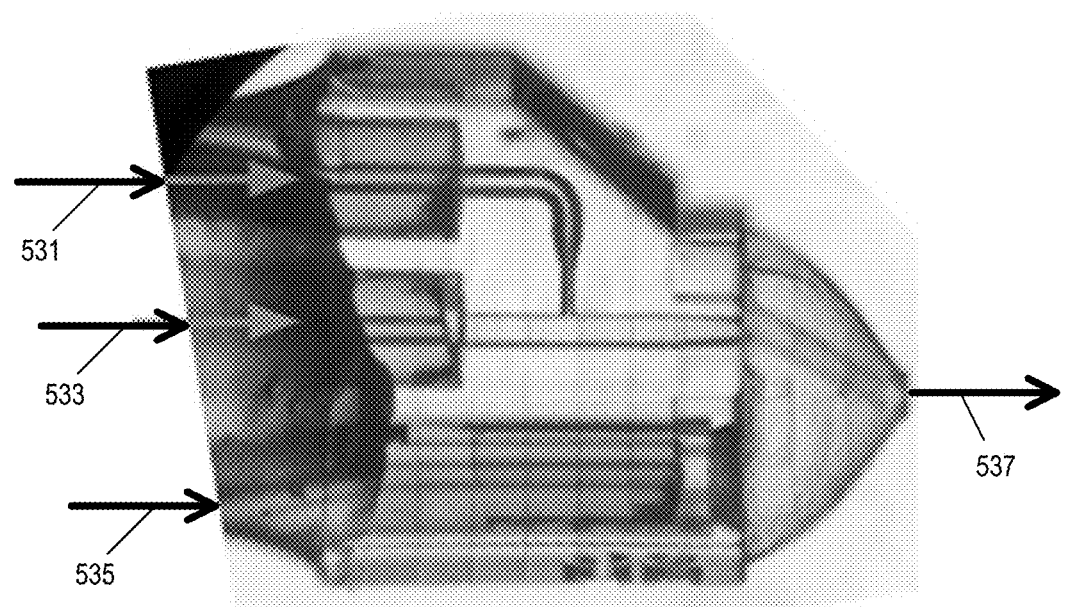
FIG. 5C is a transparent overhead view of the jet nozzle of FIG. 5A annotated to demonstrate fluid flow.

FIG. 5C illustrates a transparent view of the co-flow device 500 and the flow direction of fluids and gases during operation. The co-flow device 500 receives a sample stream 531 and an oil stream 533 which are then combined in a co-flow output manner by the T-junction portion of the co-flow device. A pressurized gas 535 (such as, for example, helium) is also provided to the co-flow device causing a liquid stream (including both the sample and the oil) to be ejected as a jet stream 537 from the output opening of the nozzle.

Figure 6:
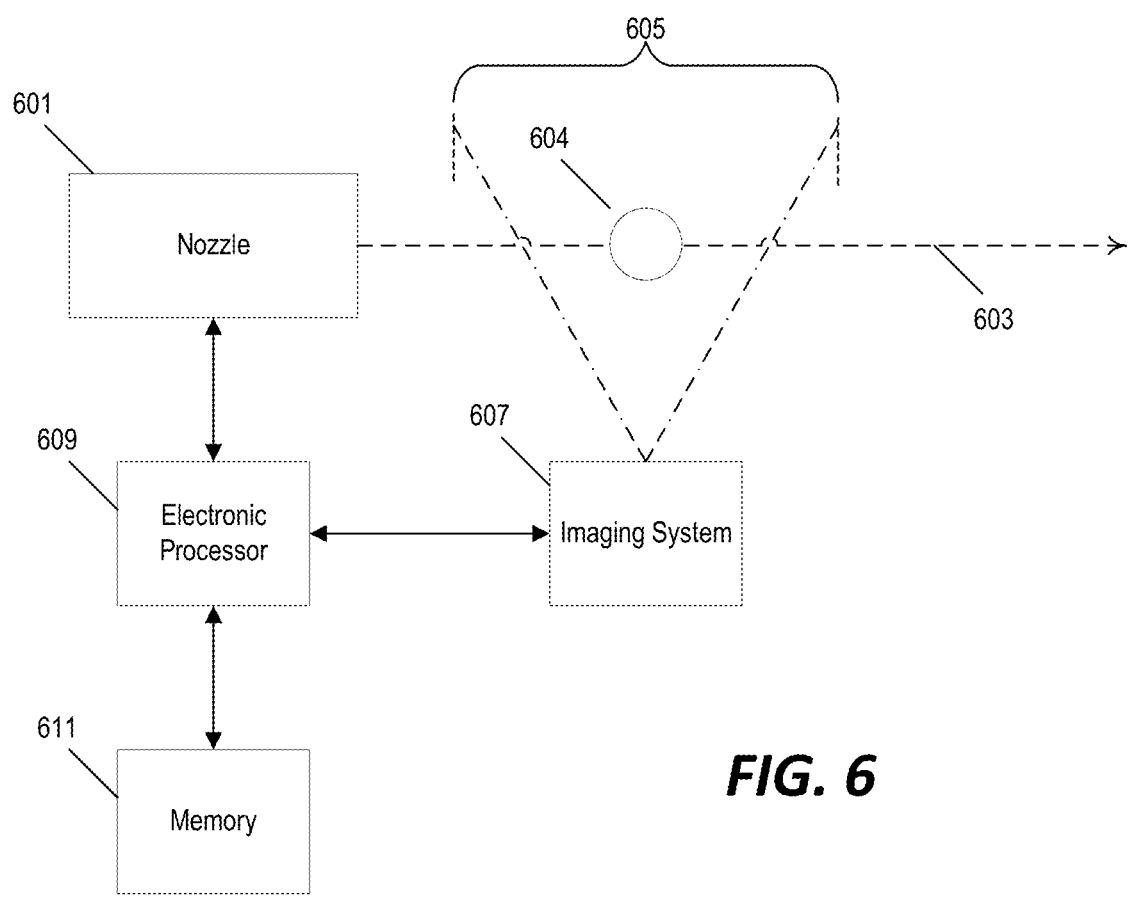
FIG. 6 is a schematic block diagram of a serial crystallography system including the sample ejection system of FIG. 1.

In some implementations, the systems and methods described above in reference to FIGS. 1 through 5C are configured for use in serial crystallography. FIG. 6 illustrates one example of a crystallography system configured for use with the sample ejection systems described above. The system of FIG. 6 includes a nozzle 601 configured to eject a sample as a continuous stream 603. The sample stream 603 passes through the field of view 605 of an imaging system 607. In some implementations, the imaging system 607 includes an emitter configured to emit x-rays, laser beam(s), electrons, or other particles and a camera configured to capture image data. For example, the imaging system in some implementations is configured to project an X-ray beam towards the sample stream 603 and to capture image data of the x-rays interacting with the sample stream 603. In the example of FIG. 6, the point at which the X-ray beam crosses the sample stream 603 is illustrated as point 604. In some such implementations, diffraction patterns of the x-rays caused by interaction with the sample stream are captured in the image data and are analyzed to determine the crystal structure of the sample.

In the example of FIG. 6, the imaging system 607 and the nozzle 601 are both controlled by an electronic processor 609. The electronic processor 609 is communicatively coupled to a non-transitory computer-readable memory 611 that stores data (e.g., image data captured by the imaging system) and computer-executable instructions. The instructions stored on the memory 611 are executed by the electronic processor 609 to provide the functionality of the system of FIG. 6 including, for example, controlling the imaging system 607 to adjust and regulate the x-rays projected by the imaging system 607 toward the sample stream 603, controlling the imaging system 607 to capture image data of the sample stream 603, analysis of the image data captured by the imaging system 607 to determine the structure of the sample, control of the fluid pumps in the sample ejection system (e.g, system 100 of FIG. 1) to regulate the co-flow of fluid ejected through the nozzle 601, control of a pneumatic pump or pressurized gas source to adjust/regulate the air used to expel the fluid through the nozzle as a jet stream, and reading of various sensors as feedback for the control of the sample ejection system 100.

Figure 7A:
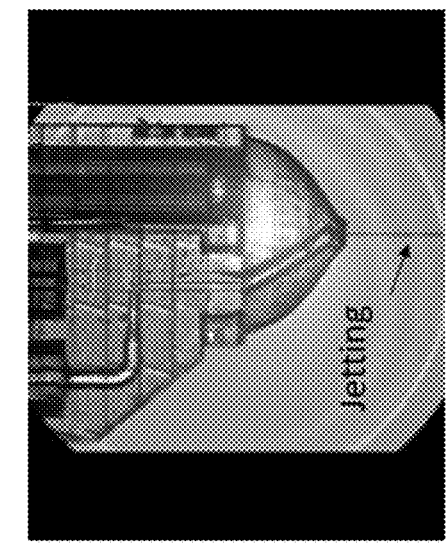
FIGS. 7A, 7B, and 7C are transparent overhead views of the jet nozzle of FIG. 5A operating at different flow rate settings.
Figure 7B:
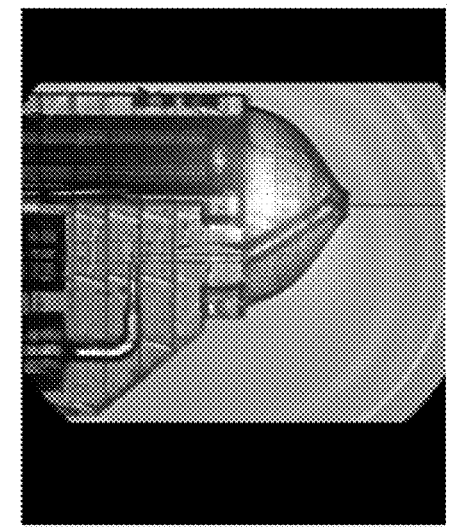
Figure 7C:
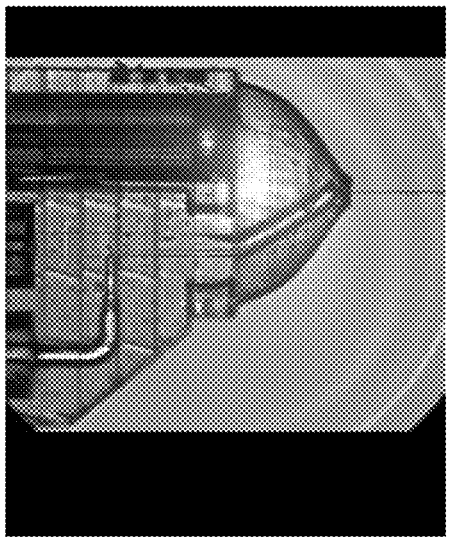

As described above in reference to FIG. 1, the sample ejection system can regulate the ratio of sample-to-oil in the final fluid stream that is ejected through the nozzle by controllably adjusting the operation of the various pumps. Changing the ratio of sample-to-oil in the final fluid stream will affect the performance and co-flow characteristics of the output stream. FIGS. 7A, 7B, and 7C illustrate operation of the co-flow device 500 of FIG. 5A operating at three different pump pressure settings. In FIG. 7A, the oil and the aqueous sample suspension are both being pumped towards the T-junction at the same flow rate (i.e., 10 µL/min) for an oil-to-sample ratio of 1:1. In FIG. 7B, the system is being operated for an oil flow rate of 15 µL/min and an aqueous sample suspension flow rate of 5 µL/min for an oil-to-sample ratio of 3:1 in the final output stream. In FIG. 7C, the system is being operated for an oil flow rate of 18 µL/min and an aqueous sample suspension flow rate of 2 µL/min for an oil-to-sample ratio of 9:1 in the final output stream.

Figure 7D:
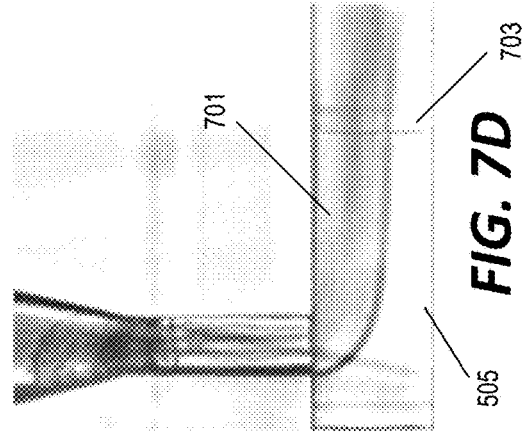
FIGS. 7D, 7E, and 7F are transparent overhead views of the T-junction co-flow device illustrating co-flow at each of the different flow rate settings of FIGS. 7A, 7B, and 7C, respectively.
Figure 7E:
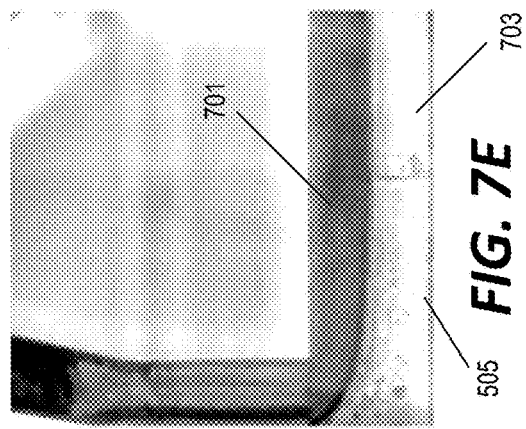
Figure 7F:
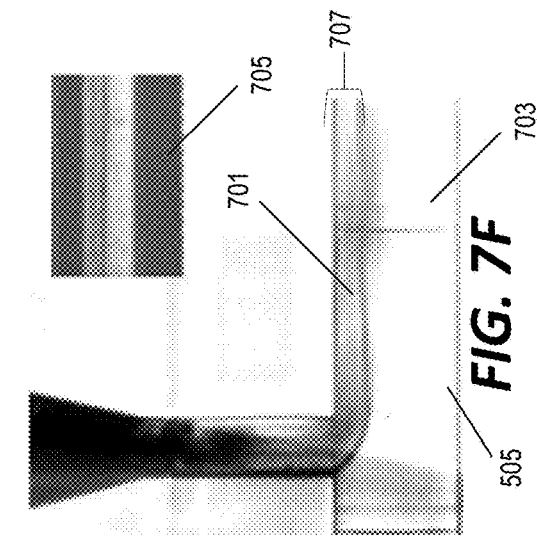

As illustrated in the images of FIGS. 7A, 7B, and 7C, all three of these fluid flow rate settings result in a "jetting" of the output stream ejected from the nozzle. However, the different flow rate settings have different effects on the characteristics of the co-flow of the oil and sample between the T-junction and the nozzle output. FIGS. 7D, 7E, and 7F show the co-flow after the T-junction at the three different flow rate settings of FIGS. 7A, 7B, and 7C, respectively. In FIG. 7D, when the oil flow rate and the sample flow rate are both controlled at 10 µL/min for a 1:1 ratio, parallel co-flow of the sample 701 and the oil 703 are exhibited in the co-flow channel 505 after the sample 701 is introduced at the T-junction. As shown in FIGS. 7E and 7F, when the oil-to-sample ratio is adjusted to 3:1 and then to 9:1, parallel co-flow of the sample 701 and the oil 703 is still observed, but the "thickness" 707 of the sample in the stream is reduced. The inset 705 in FIG. 7F shows a cross-section of the fluid flow through the output channel (i.e., output channel 517 of the co-flow device 500 of FIG. 5A) at a distance of 2.5 cm past the T-junction. As shown in FIG. 7F, the parallel co-flow of sample 701 and oil 703 remains stable at this distance.

Figures 8, 9:
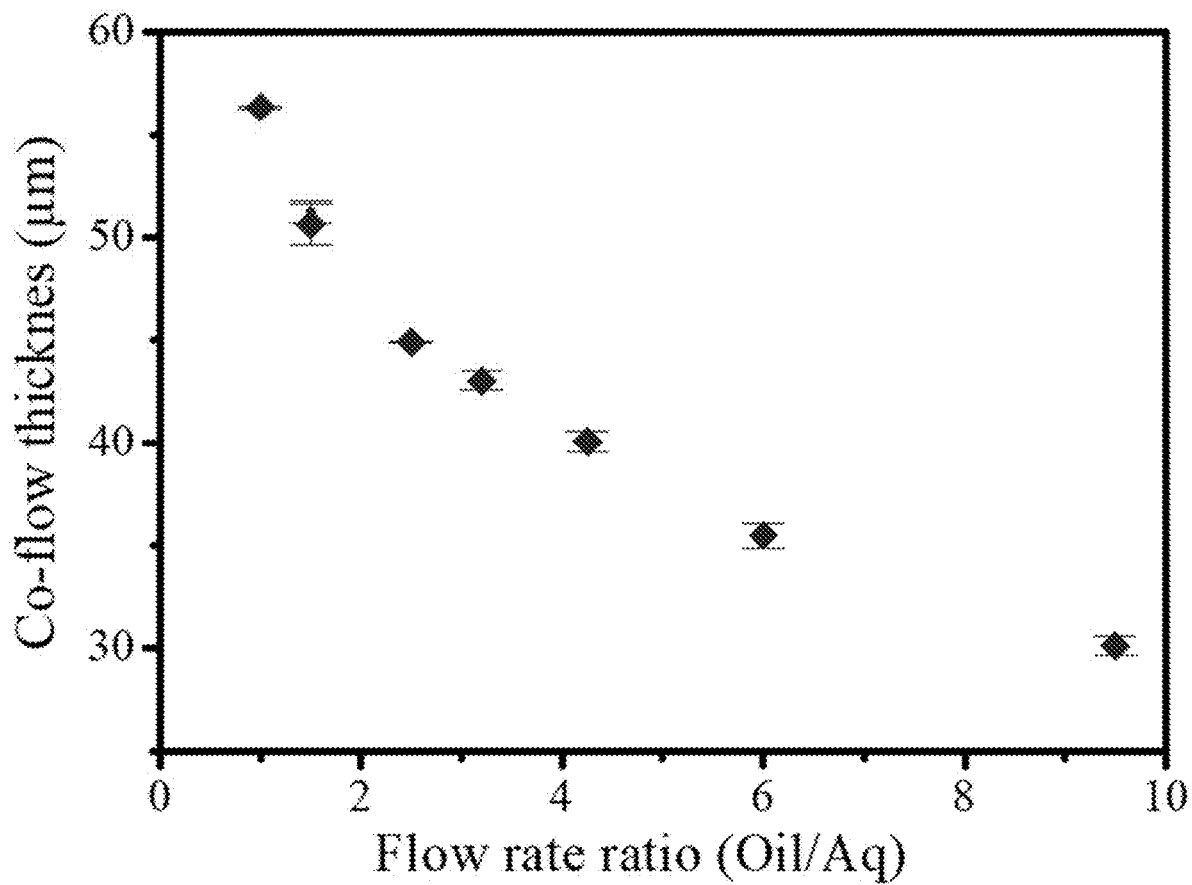
FIG. 8 is a graph of co-flow thickness relative to flow rate ratio for the jet nozzle of FIG. 5A.
FIG. 9 is a table of observed co-flow stability in the jet nozzle of FIG. 5A at various different flow rate settings.

Accordingly, as illustrated in the examples of FIGS. 7A through 7F, the co-flow device 500 of FIG. 5A can achieve "jetting" of the fluid output at a variety of different flow rate settings. However, co-flow properties—including, for example, co-flow thickness and co-flow stability—can be adjusted and regulated by operating the respective pumps to adjust the flow rate settings of the aqueous sample suspension and the oil towards the T-junction. FIG. 8 illustrates the co-flow thickness 707 of the sample stream at a plurality of different oil-to-sample flow rate ratios. As shown in FIG. 8, the co-flow thickness is reduced as the proportion of sample relative to the amount of oil is reduced; however, the reduction in co-flow thickness is not necessarily linear. FIG. 9 illustrates various control settings and observed performance output (including a distance from the T-junction at which stable co-flow is observed) under three separate operating conditions.

Furthermore, although FIG. 6 illustrates an imaging system 607 configured to capturing image data of the laser beam 604 interfaces with the sample stream 603, in some implementations, the imaging system 607 or a different, additional imaging system may be configured to capture image data of the jet leaving the nozzle to monitor the quality of the co-flow achieved by the operation of the system. For example, the imaging system 607 may be configured so that the field of view 605 is wide enough to capture image data indicative of diffraction of the laser beam cause by the sample stream 603 while also capturing image data of the sample stream 603 leaving the nozzle 601 before reaching the laser beam 604. In some such implementations, the electronic processor 609 and the memory are configured to separately analyze image data from different locations within the field of view to quantify laser beam diffraction and co-flow characteristics of the sample stream 603.

The examples described above are just a few specific implementations. The structure, techniques, and methods described herein can be adjusted or incorporated into other implementations. For example, although FIG. 6 shows a single electronic processor 609 controlling both the imaging system 607 and the output of the nozzle 601, in some implementations, the imaging system 607 and the sample ejection system are operated by separate control systems that may (or may not) be communicatively coupled to each other. Furthermore, the T-junction component 300 of FIG. 3A and the co-flow device 500 of FIG. 5A are configured—in some implementations—to provide a "jetted" sample flow output that is compatible with European X-ray free electron laser (EuXFEL) operation for serial crystallography, in other implementations, the T-junction, co-flow, and nozzle components describe herein may be configured for use in other crystallography applications.

Accordingly, the systems and methods described herein provide a device for adjusting the proportion of sample in an ejected output stream by using a T-junction to achieve parallel co-flow of a sample suspension fluid and an oil in an output channel towards a nozzle output. Other features and advantages of the invention are set forth in the following claims.

What is claimed is:

1. A sample ejection device for serial crystallography comprising:
    a sample fluid channel;
    an immiscible oil fluid channel;
    an output channel; and
    a T-junction coupling the sample fluid channel and the immiscible oil fluid channel to the output channel,
        wherein the T-junction is configured to receive an aqueous suspension of a crystal sample from the sample fluid channel in a first flow direction and to receive a an immiscible oil from the second fluid channel in a second flow direction, the second flow direction being perpendicular to the first flow direction at the T-junction; and,
        wherein the T-junction is configured to output a combined fluid output to the output channel in the second flow direction, the combined fluid output including a parallel co-flow of the aqueous suspension of the crystal sample flowing in contact with a first interior surface of the output channel and the immiscible oil flowing parallel to the aqueous suspension of the crystal sample in contact with a second interior surface of the output channel.

2. The sample ejection device of claim 1, further comprising a jet nozzle configured to receive the combined fluid output from the T-junction and to eject the combined fluid output in a jetted output stream.

3. The sample ejection device of claim 2, wherein the jet nozzle is configured to eject the combined fluid output in the jetted output stream into a field of view of a crystallography imaging system.

4. The sample ejection device of claim 2, wherein the jet nozzle is configured to eject the combined fluid output in the jetted output stream into an optical path of an X-ray free electron laser.

5. The sample ejection device of claim 2, wherein the jet nozzle is configured to eject the combined fluid output in the jetted output stream by coaxially expelling a pressurized gas and the combined fluid output in an output flow direction with the ejected pressurized gas surrounding a perimeter of the ejected combined fluid output.

6. The sample ejection device of claim 5, wherein the pressurized gas is helium.

7. The sample ejection device of claim 1, further comprising:
    a sample reservoir containing the aqueous suspension of the crystal sample;
    an oil reservoir containing the immiscible oil;
    one or more pumps configured to pump the aqueous suspension of the crystal sample from the sample reservoir through the sample fluid channel at a first flow rate and to pump the immiscible fluorinated oil from the oil reservoir through the immiscible oil fluid channel at a second flow rate; and
    a controller configured to independently control a sample output rate of the combined fluid output by independently regulating the first flow rate of the sample fluid channel and the second flow rate of the immiscible oil fluid channel.

8. The sample ejection device of claim 1, wherein the sample fluid channel includes a tapered section configured to reduce a diameter of the sample fluid channel from a first diameter to a second diameter.

9. The sample ejection device of claim 1, wherein the sample fluid channel is configured to receive the aqueous suspension of the crystal sample in the second flow direction, wherein the immiscible oil fluid channel is configured to receive the immiscible oil in the second flow direction, and wherein the sample fluid channel includes a curved section to change the flow direction of the aqueous suspension of the crystal sample from the second flow direction to the first flow direction.

10. The sample ejection device of claim 1, further comprising a single-piece component including:
    the T-junction;
    a pressurized gas channel,
    an internal nozzle volume,
    a nozzle opening, and
    the output channel,
    wherein the pressurized gas channel is configured to receive a pressurized gas and to convey the pressurized gas to the internal nozzle volume,
    wherein the nozzle opening is positioned to allow the pressurized gas to exit the internal nozzle volume in a first output direction through the nozzle opening, and
    wherein the output channel extends into the internal nozzle volume to a location proximal to the nozzle opening such that the combined fluid output is ejected from a distal end of the output channel towards the nozzle opening in the first output direction and coaxially surrounded by the pressurized gas.

11. A method of performing serial crystallography using the sample ejection device of claim 1, the method comprising:
    pumping the immiscible oil fluid through the immiscible oil fluid channel toward the T-junction at a first flow rate;

pumping the aqueous suspension of the crystal sample through the sample fluid channel toward the T-junction at a second flow rate; and combining the immiscible oil fluid and the aqueous suspension of the crystal sample at the T-junction into the combined fluid output including the parallel co-flow of the immiscible oil fluid and the aqueous suspension of the crystal sample.

12. The method of claim 11, further comprising:

ejecting the combined fluid output through a nozzle as a jetted stream towards an optical path of an x-ray laser; and adjusting a sample flow rate of the crystal sample in the jetted stream by controllably adjusting the first flow rate of the immiscible oil fluid through the immiscible oil fluid channel and the second flow rate of the aqueous suspension of the crystal sample through the sample fluid channel.

13. A method of performing serial crystallography, the method comprising:

providing an aqueous suspension of a crystal sample to a T-junction at a first flow rate;

providing an immiscible fluorinated oil fluid to the T-junction at a second flow rate;

combining the aqueous suspension of the crystal sample and the immiscible fluorinated oil fluid at the T-junction to produce a co-flow output fluid including a parallel co-flow of the aqueous suspension of the crystal sample and the immiscible fluorinated oil fluid;

wherein the aqueous suspension is introduced to the flowing immiscible fluorinated oil at an angle relative to the flow channel of the immiscible fluorinated oil at the T-junction; and, wherein the parallel co-flow of the aqueous suspension of the crystal sample and the immiscible fluorinated oil includes the aqueous suspension of the crystal sample flowing along the flow channel in contact with a first interior surface of the flow channel and the immiscible fluorinated oil flowing along the flow channel in contact with a second interior surface of the flow channel, the second interior surface being opposite the first interior surface;

ejecting the co-flow output fluid as a jet stream through a nozzle, wherein the co-flow output maintains the parallel co-flow in the flow channel from the T-junction to the nozzle; and adjusting the sample flow rate of the crystal sample in the jet stream by adjusting the first flow rate of the aqueous suspension of the crystal suspension and the second flow rate of the immiscible fluorinated oil fluid.

* * * * *